United States Patent [19]

Kato et al.

[11] Patent Number: 5,071,232

[45] Date of Patent: Dec. 10, 1991

[54] OPTICAL DEFLECTION ELEMENT AND SPACE OPTICAL MATRIX SWITCHING DEVICE

[75] Inventors: Masayoshi Kato, Zama; Toshiyuki Inokuchi, Yokohama, both of Japan

[73] Assignee: Ricoh Company, Ltd., Tokyo, Japan

[21] Appl. No.: 558,440

[22] Filed: Jul. 27, 1990

[30] Foreign Application Priority Data

Aug. 1, 1989 [JP]  Japan ................................. 1-199926
Nov. 22, 1989 [JP]  Japan ................................. 1-304412

[51] Int. Cl.$^5$ .......................... G02B 6/32; G02F 1/03
[52] U.S. Cl. ...................................... 359/315; 359/15; 385/33
[58] Field of Search .................. 350/356, 96.18, 96.11, 350/96.12, 96.13, 96.14, 96.15, 355

[56] References Cited

U.S. PATENT DOCUMENTS

| | | | |
|---|---|---|---|
| 3,572,898 | 3/1971 | Eaglesfield | 350/356 |
| 3,626,511 | 12/1971 | Hammer | 350/356 |
| 4,185,274 | 1/1980 | Giallorenzi | 340/347 P |
| 4,852,962 | 8/1989 | Nicia | 350/96.20 |

FOREIGN PATENT DOCUMENTS

| | | | |
|---|---|---|---|
| 58-111019 | 7/1983 | Japan | 350/356 |
| 60-192926 | 10/1985 | Japan | 350/356 |

*Primary Examiner*—Frank Gonzalez
*Attorney, Agent, or Firm*—Oblon, Spivak, McClelland, Maier & Neustadt

[57] ABSTRACT

An optical deflection element receives incident beam and deflects the incident beam with an arbitrary deflection angle. The optical deflection element includes a plurality of unit members which are successively stacked and each including an electrooptic layer, an electrode layer formed on a surface of each electrooptic layer, and an insulator layer formed on the surface of each electrooptic layer adjacent to the electrode layer, where a boundary between the electrode layer and the insulator layer is inclined to an optical axis of the incident beam.

12 Claims, 4 Drawing Sheets

OPTICAL DEFLECTION ELEMENT AND SPACE OPTICAL MATRIX SWITCHING DEVICE

BACKGROUND OF THE INVENTION

The present invention generally relates to optical deflection elements and space optical matrix switching devices, and more particularly to an optical deflection element which uses the electrooptic effect to make an optical path switching and the like, and to a space optical matrix switching device such as a spatial light modulator and a parallel optical switch which are used in the fields of optical communications, optical information processing systems and the like.

FIG. 1 shows an example of a conventional space optical matrix switching device proposed in a Japanese Laid-Open Patent Application No. 58-111019. A diffraction grating (not shown) is formed on a photosensitive medium 1 using light interference, and light emitted from a photoemitter circuit 2 is passed through a collimator means 3. The diffraction grating on the photosensitive medium 1 is used to emit a light beam at a predetermined position on a photoreceptor circuit 4 so as to obtain an optical connection.

According to the space optical matrix switching device shown in FIG.1, a crystal such as BSO crystal having both photoconductive effect and electrooptic effect is used for the photosensitive medium 1. In this case, an arbitrary diffraction grating can be formed by the writing light and the diffraction grating becomes variable. As a result, it becomes possible to arbitrarily select the optical connection between the photoemitter circuit 2 and the photoreceptor circuit 4.

However, the space optical matrix switching device basically requires a write system for forming the diffraction grating and an optical system for separating the writing light and the signal light, and the device as a whole becomes bulky. In addition, the electrooptic effect of the electrooptic crystal such as the BSO crystal is generally small, and the diffraction efficiency of the grating induced by the light is small. Accordingly, when such a space optical matrix switching device is used for a conversion of an optical path, for example, the conversion becomes insufficient and the switching characteristic becomes poor.

On the other hand, optical deflection elements which use the acoustooptic effect or mechanically drives a prism or optical fiber have been proposed recently. However, it is difficult to realize a high-speed optical deflection by such optical deflection elements. Hence, there are proposals to make the optical deflection using the electrooptic effect.

A description will now be given of an example of a conventional optical deflection element which uses the electrooptic effect and proposed in a Japanese Laid-Open Patent Application No. 60-192926, by referring to FIGS. 2, 3A and 3B. An optical deflection element 11 includes two triangular column shaped electrooptic elements 12 and 13 which are bonded to form a parallelpiped shaped element 14. The electrooptic elements 12 and 13 have optic axes in mutually opposite directions. Optical fibers 15 and 16 which form optical paths are connected to a first surface of the electrooptic element 12, while optical fibers 17 and 18 which form optical paths are connected to a second surface of the electrooptic element 13, where the first and second surfaces are located on opposite ends of the element 14. An electrode layer 19 is formed on a top surface of the element 14 including a border part between the electrooptic elements 12 and 13, and an electrode layer 20 is formed on a bottom surface of the element 14 including the border part between the electrooptic elements 12 and 13. A driving power source 21 is connected across the electrode layers 19 and 20. Optic axes of the optical fibers 15 and 17 match, while the optical fibers 16 and 18 are respectively provided adjacent to the optical fibers 15 and 17.

As may be seen from FIG. 3A, when no voltage is applied across the electrode layers 19 and 20 by the driving power source 21, the light emitted from the optical fiber 15 into the element 14 progresses through the optical fiber 17 having the matching optical axis since the refractive indexes of the electrooptic elements 12 and 13 are approximately the same. On the other hand, when the voltage is applied across the electrode layers 19 and 20 by the driving power source 21, the light emitted from the optical fibers 15 and 16 into the element 14 is refracted at the boundary surface between the electrooptic elements 12 and 13 and progress through the respective optical fibers 18 and 17 because the refractive indexes of the electrooptic elements 12 and 13 having the optic axes in the mutually different directions change.

The optical deflection element 11 enables the switching of the optical path by turning the driving power source 21 ON/OF using the electrooptic effect. Hence, this optical deflection element 11 can be used as parts of the optical information processing systems and the like.

One of the parameters which determine the performance of the optical deflection element 11 is the resolution. A resolution N can be described by the following formula (1), where $\phi$ denotes a deflection angle and $\theta$ denotes a spread angle of the light beam with respect to the optical axis.

$$N = \phi/\theta \qquad (1)$$

The performance of the optical deflection element 11 is better when the resolution N is larger. In addition, the spread angle $\theta$ of the light beam can be described by the following formula (2), where $\lambda$ denotes a wavelength of the light beam and $\omega$ denotes a beam diameter of the light beam.

$$\theta = \epsilon\lambda/\omega \qquad (2)$$

In the formula (2), $\epsilon$ is a constant which is dependent on the beam shape and the intensity distribution of the light beam, and this constant $\epsilon$ is close to one. For example, when the beam shape is circular and the intensity distribution is uniform, $\epsilon = 1.22$.

As may be readily seen from the formulas (1) and (2), it is necessary to reduce the spread angle $\theta$ of the light beam with respect to the deflection angle $\phi$ in order to improve the resolution N, and this may be achieved by increasing the beam diameter $\omega$.

In other words, in order to improve the resolution N of the optical deflection element 11, it is necessary to increase the thickness of the element 14 and enlarge the beam diameter $\omega$. However, in this case, the refractive indexes of the electrooptic elements 12 and 13 decrease because the refractive indexes are proportional to the applied voltage and inversely proportional to the distance between the electrode layers 19 and 20. As a result, the capacity of the driving power source 21 must be increased in order to obtain the necessary deflection angle φ, which is undesirable from the practical point of view.

SUMMARY OF THE INVENTION

Accordingly, it is a general object of the present invention to provide a novel and useful optical deflection element and space optical matrix switching device, in which the problems described above are eliminated.

Another and more specific object of the present invention is to provide an optical deflection element for receiving incident beam and deflecting the incident beam with an arbitrary deflection angle, comprising a plurality of unit members which are successively stacked, where each of the unit members includes an electrooptic layer, an electrode layer formed on a surface of each electrooptic layer, and an insulator layer formed on the surface of each electrooptic layer adjacent to the electrode layer, where a boundary between the electrode layer and the insulator layer is inclined to an optical axis of the incident beam. According to the optical deflection element of the present invention, it is possible to obtain a relatively large deflection angle by applying a relatively small voltage across the electrode layers. The number of unit members may be increased to enlarge the beam diameter and thus improve the resolution. In addition, a large deflection angle can be obtained with a small power consumption.

Still another object of the present invention is to provide a space optical matrix switching device comprising a collimator element including an array of microlenses for receiving incident beam, a space deflection element coupled to the collimator element and including an array of optical deflection elements for deflecting collimated beam received from the collimator element depending on a change in a refractive index based on electrooptic effect, a deflection angle amplifier element coupled to the space deflection element and including an array of microholograms for amplifying a deflection angle of deflected beam received from the space deflection element by diffraction so as to switch an optical path of the deflected beam, and coupling means coupled to the deflection angle amplifier element for selectively outputting the deflected beam received via the switched optical path. According to the space optical matrix switching device of the present invention, it is possible to realize a satisfactory switching characteristic such that the optical path is switched positively. The optical elements on the output end of the space optical matrix switching device may be designed with a large degree of freedom. In addition, the device as a whole is compact, yet a high-speed switching is possible.

Other objects and further features of the present invention will be apparent from the following detailed description when read in conjunction with the accompanying drawings.

DESCRIPTION OF THE PREFERRED EMBODIMENTS

Figure 1:
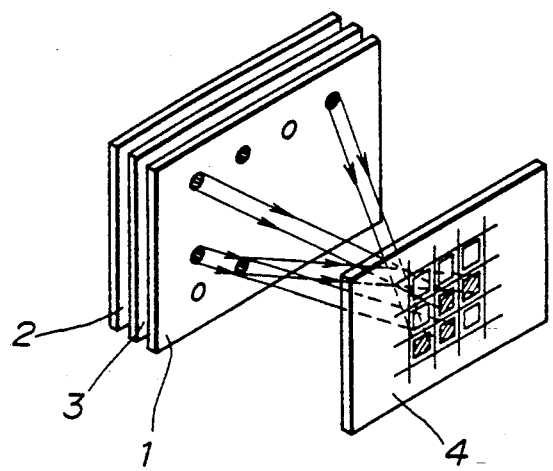
FIG. 1 is a perspective view showing an example of a conventional space optical matrix switching device.

A description will be given of an embodiment of a space optical matrix switching device according to the present invention, by referring to FIGS. 4 through 6. In this embodiment, a space optical matrix switching device includes a collimator element 31 which is made up of a microlens array, a space deflection element 32 which is made up of an optical deflection element array, a deflection angle amplifier element 33 which is made up of a microhologram array, an angle conversion element 34 which is made up of a coupling element array, and a coupling element 35 which are successively stacked in a light propagation direction.

The collimator element 31 includes refractive index distribution type microlenses 36 which are arranged in a two-dimensional array on a surface thereof on the light emitting side. The space deflection element 32 uses as a base an electrooptic crystal 37 such as a $LiNbO_3$, and an electrode pair 38 is provided for each microlens 36 and such electrode pairs 38 are arranged in a two-dimensional array. As will be described later in more detail, the light incident to the space deflection element 32 is deflected in a predetermined direction by variable controlling a voltage which is applied across each electrode pair 38 (that is, the field between electrodes of each electrode pair 38).

The deflection angle amplifier element 33 includes a plurality of microholograms 39 which are arranged in an array in the deflection direction for each microlens 36. The holograms 39 have mutually different diffraction directions and diffract the incident beam in predetermined directions within a microregion which is approximately in the order of the beam diameter of the incident beam. The angle conversion element 34 has a structure similar to that of the deflection angle amplifier element 33, and includes microholograms 40 which are arranged in the deflection direction in an array in correspondence with the holograms 39. The coupling element 35 has a structure similar to that of the collimator element 31, and includes refractive index distribution type microlenses 41 which are arranged in a two-dimensional array on a surface thereof on the light emitting side.

The holograms 39 and 40 can be formed in an array on a glass substrate or the like with a high accuracy and high density using a process such as electron beam drawing and dry etching. In addition, the diffraction index distribution type microlenses 36 and 41 can be formed in an array on a glass substrate or the like with a high accuracy using ion exchange.

A description will be given of an operation of this embodiment of the space optical matrix switching device with reference to FIG. 5. In FIG. 5, input optical fibers 42a and 42b are coupled to collimator element 31 at the input side corresponding to positions of the microlenses 36. In addition, output optical fibers 43a and 43b are coupled to the coupling element 35 at the output side corresponding to positions of the microlenses 41.

First, light 44 received from the input optical fiber 42a is collimated by the corresponding microlens 36 of the collimator element 31 and is supplied to the space deflection element 32. In the space deflection element 32, a predetermined field is applied between electrodes of the corresponding electrode pair 38 and the collimated beam is deflected so that the collimated beam passing between the electrodes of the electrode pair 38 reaches a desired hologram 39 of the deflection angle amplifier element 33. The deflected beam which passes the desired hologram 39 of the deflection angle amplifier element 33 is diffracted so as to reach a desired hologram 40 of the angle conversion element 34.

Figure 5:
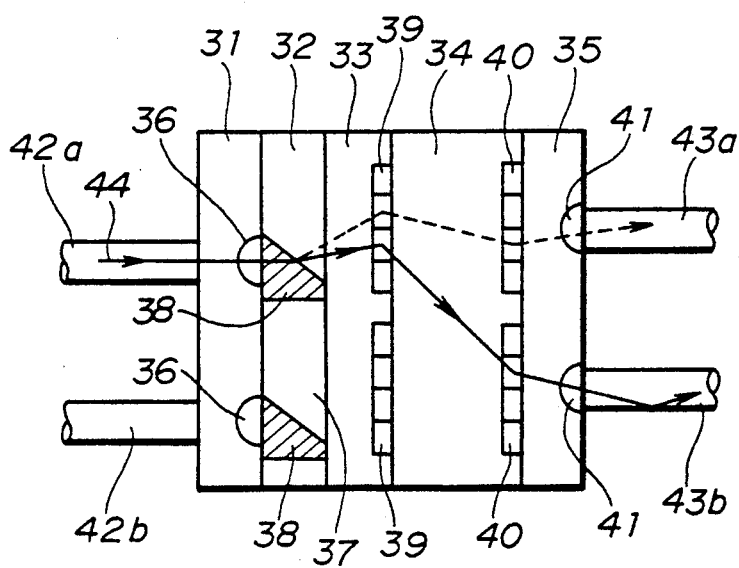
FIG. 5 is a side view in cross section showing the embodiment of the space optical matrix switching device.
Figure 6:
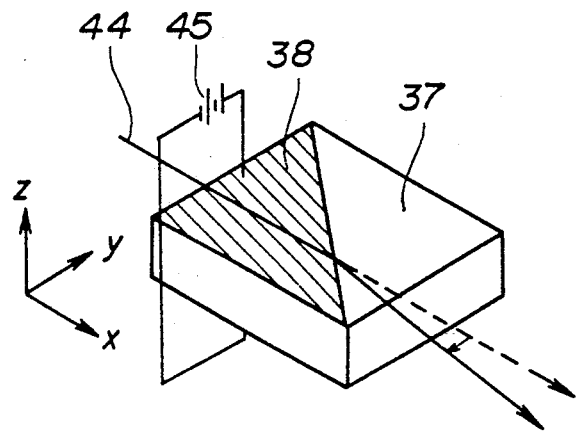
FIG. 6 is a perspective view for explaining an operation of a space deflection element of the embodiment of the space optical matrix switching device.

As may be seen from FIG. 5, a deflection occurs in the space deflection element 32 using the electrooptic effect, and the deflection angle is amplified by the diffraction in the hologram 39. Thereafter, the light from the hologram 40 reaches the corresponding microlens 41 of the coupling element 35 and is emitted to the corresponding output optical fiber 43b. Hence, even when the length of the element at the stage subsequent to the deflection angle amplifier element 33 is shortened, it is possible to optically switch and couple the input optical fibers 42a, 42b and the like to the output optical fibers 43a, 43b and the like. The space optical matrix switching device as a whole is therefore thin and compact.

When the intensity of the field applied between the electrodes of the electrode pair 38 of the space deflection element 32 is varied so as to change the deflection angle of the light 44 as indicated by a phantom line in FIG. 5, for example. By selecting the hologram 39 of the deflection angle amplifier element 33 and the hologram 40 of the angle conversion element 34 having different diffraction direction and angle, it is possible to couple the input optical fiber 42a to the output optical fiber 43a. In other words, it is possible to carry out an optical switching in which one of the output optical fibers 43a and 43b is selected.

Next, a description will be given of the deflection function of the space deflection element 32, by referring to FIG. 6. When one element of the space deflection element 32 is extracted and examined, the electrode pair 38 is formed on confronting sides of the rectangular electrooptic crystal 37 which is made of LiNbO₃ along a z-axis direction as shown in FIG. 6, and the field is applied in the z-axis direction. The electrodes of the electrode pair 38 have a right-angled triangular shape, so that a boundary surface between a first region applied with the field and a second region applied with no field is inclined to the optical axis of the incident beam 44. No change occurs in the refractive index of the entire electrooptic crystal 37 when no voltage is applied across the electrode pair 38 by a power source 45. But when a voltage is applied across the electrode pair 38 by the power source 45, a change occurs in the refractive index due to the electrooptic effect in a region between the electrodes of the electrode pair 38 where the field is influential, and a difference is generated between the refractive indexes of the region where the electrode pair 38 exists and the region where the electrode pair 38 does not exist.

When a field applied in the z-axis direction across the electrodes of the electrode pair 38 is denoted by $E_z$, a refractive index when $E_z = 0$ is denoted by $n_z$ and an electrooptic constant of the electrooptic crystal 37 is denoted by $\delta_{33}$, a change $\Delta n_z$ which occurs in the refractive index can be described by the following formula (3). In other words, the change $\Delta n_z$ in the refractive index is proportional to the applied field $E_z$.

$$\Delta n_z = (\tfrac{1}{2})\delta_{33} n^3_z E_z \qquad (3)$$

Hence, the light 44 incident to the electrooptic crystal 37 is emitted under influence of the difference in the refractive indexes of the region where the electrode pair 38 exists and the region where the electrode pair 38 does not exist and the deflection at the inclined boundary surface described above. A phantom line in FIG. 6 indicates a case where there is no influence of the deflection. The elements having the structure shown in FIG. 6 are arranged in an array and integrated to form the space deflection element 32. For example, a mechanical process, an etching or the like is made on a LiNbO₃ substrate to form holes for the electrode pair 38, and electrode material is filled inside the holes to monolithically form the space deflection element 32 shown in FIG. 4. Hence, it is possible to operate the optical deflection elements in parallel at a high speed and with a high density.

Figure 4:
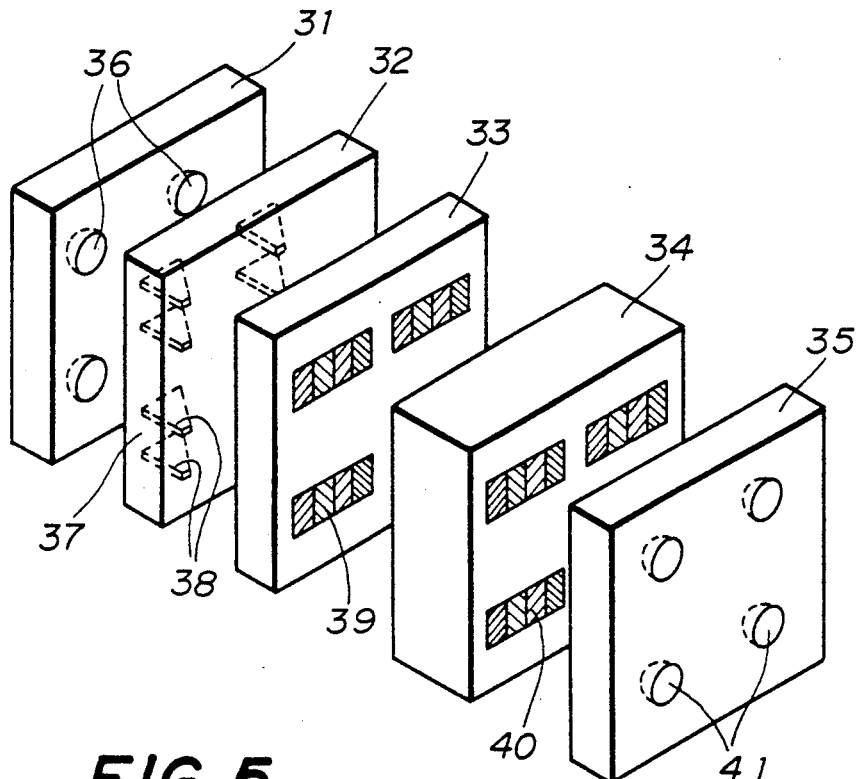
FIG. 4 is a disassembled perspective view showing an embodiment of a space optical matrix switching device according to the present invention.

The space optical matrix switching device according to the present invention is not limited to the embodiment shown in FIG. 4. For example, an array of space deflection elements may be provided between the microlenses of the coupling element 35 and the array of holograms of the angle conversion element 34, so as to form a two-way optical matrix switch.

Next, a description will be given of an embodiment of an optical deflection element according to the present invention, by referring to FIGS. 7 through 10.

Figure 2:
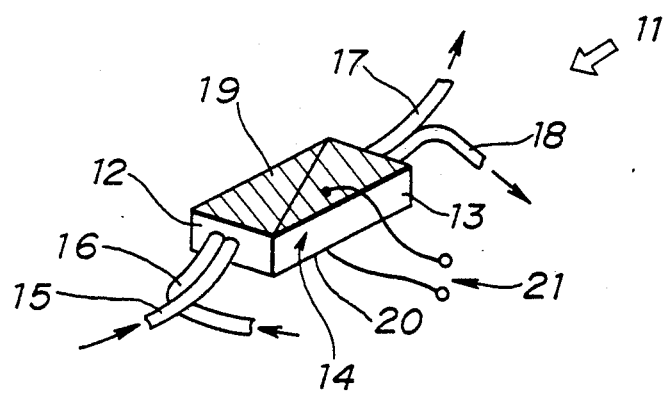
FIG. 2 is a perspective view showing an example of a conventional optical deflection element.
Figures 3A, 3B:
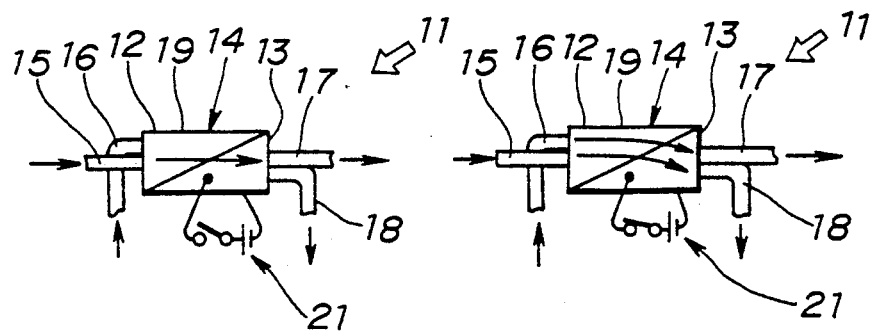
FIGS. 3A and 3B are plan views respectively showing the conventional optical deflection element shown in FIG. 2 in a state where no voltage is applied across electrode layers and a state where a voltage is applied across the electrode layers.
Figure 7:
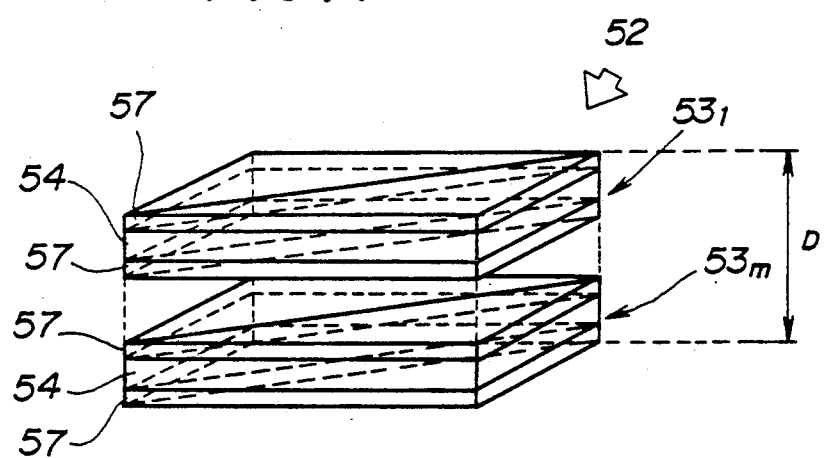
FIG. 7 is a perspective view showing an embodiment of an optical deflection element according to the present invention.
Figure 8:
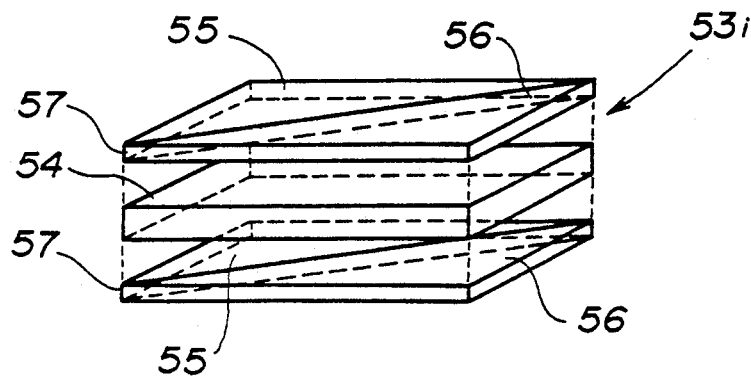
FIG. 8 is a perspective view showing a part of the embodiment shown in FIG. 7 in more detail.

In this embodiment, an optical deflection element 52 includes a plurality of unit members $53_l$ through $53_m$ which are stacked as shown in FIG. 7, where the unit member $53_i$ ($i = 1, 2, \ldots, m$) functions similarly to the optical deflection element 11 shown in FIG. 2. The unit member $53_i$ includes an electrooptic layer 54 which is made of a plate-shaped electrooptic element, and thin films 57 respectively formed on mutually confronting sides of the electrooptic layer 54. As shown in FIG. 8, the thin insulator layer 56 which are adjacent to each other via a boundary which is inclined to the optical axis of the incident beam. A driving power source (not shown) is coupled between the electrode layers 55 which sandwich the electrooptic layer 54.

Figure 9:
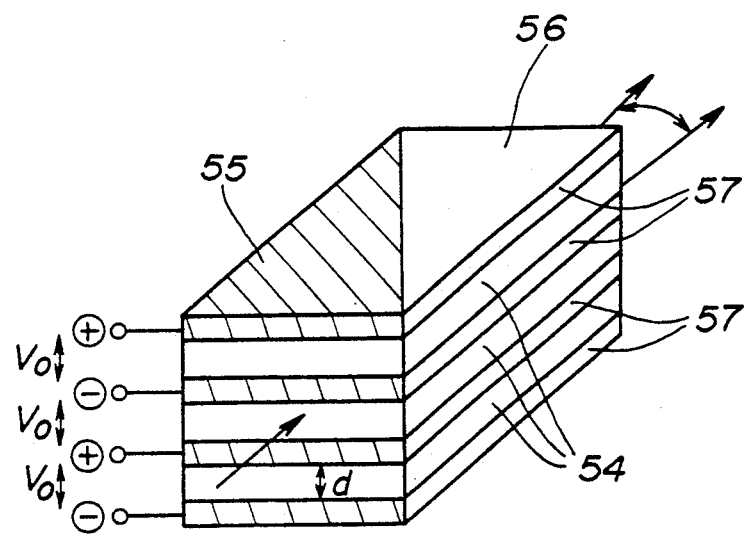
FIG. 9 is a perspective view showing the embodiment shown in FIG. 7 from another angle.
Figure 10:
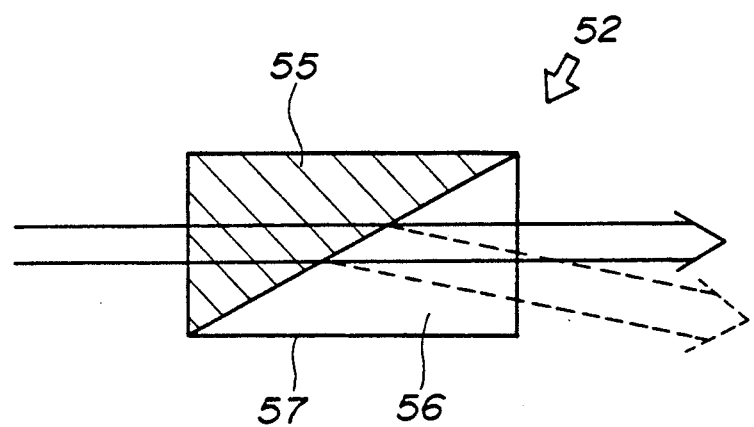
FIG. 10 is a plan view showing the embodiment of the optical deflection element.

As shown in FIG. 9, the thin film 57 of the unit members $53_l$ through $53_m$ is integrated between the electrooptic layers 54, and direction of the optical axis of the electrooptic layers 54 alternately changes into mutually opposite directions.

When the driving power source is OFF and no voltage is applied across the electrode layers 55 of the optical deflection element 52, the refractive index of the electrooptic layer 54 is uniform. In this state, the light incident to the optical deflection element 52 undergoes a rectilinear propagation through the optical deflection element 52.

On the other hand, when the driving power source is ON and a voltage is applied across the electrode layers 55, that is, across the electrooptic layers 54, the refractive index of a part of each electrooptic layer 54 located between the electrode layers 55 and the refractive index of a part of each electrooptic layer 54 located between the insulator layers 56 become mutually different. Hence, in this state, the light incident to the boundary part between the electrode layer 55 and the insulator layer 56 of the optical deflection element 52 is refracted as indicated by a phantom line in FIG. 10.

As described above, the thin film 57 is integrated between the adjacent unit members $53_i$ and $53_{i+1}$, and the current applying direction to two mutually adjacent electrooptic layers 54 are mutually opposite. In other words, the voltages applied across the mutually adjacent electrooptic layers have mutually opposite polarities. But since the directions of the optic axes of two mutually adjacent electrooptic layers 54 are also mutually opposite, the refraction directions of the light transmitted through the electrooptic layers 54 are the same.

In other words, the optical deflection element 52 can switch the optical path by turning the driving power source ON/OFF. Hence, the optical deflection element 52 is suited to used on parts of an optical information processing system and the like. For example, the optical deflection element 52 can be used as the optical deflection element making up the space deflection element 33 of the embodiment of the space optical matrix switching device described above.

A description will now be given of the functions of the optical deflection element 52 for a case where the electrode layer 55 is made of an ITO (indium tin oxide) transparent electrode, the insulator layer 56 is made of a $SiO_2$ thin film, the electrooptic layer 54 is made of $LiNbO_3$ and m unit members $53_1$ through $53_m$ are stacked.

As shown in FIG. 9, when each electrooptic layer 54 has a thickness d and a voltage $V_O$ is applied across the electrode layers 55, a change $\Delta n$ in the refractive index of the electrooptic layer 54 can be described by the following formula (4), where $n_e$ denotes a refractive index along the direction in which the thin films 57 are stacked and $r_{33}$ denotes an electrooptic coefficient.

$$\Delta n = (-\tfrac{1}{2}) n^3_e r_{33}(V_O/d) \quad (4)$$

In the optical deflection element 52, the thickness of the thin film 17 is extremely thin compared to the thickness of the electrooptic layer 54. Hence, when a thickness of the optical deflection element 52 as a whole is denoted by D, each electrooptic layer 54 has a thickness of approximately D/m. Hence, the formula (4) can be rewritten as the following formula (5).

$$\Delta n \approx m(-\tfrac{1}{2}) n^3_e r_{33}(V_O/D) \quad (5)$$

It is readily apparent from the formula (5) that the change $\Delta n$ in the refractive index in the conventional optical deflection element corresponds to a case where the constant m=1 in the formula (5). Because the constant m in this case is greater than one, the change $\Delta n$ in the refractive index of the optical deflection element 52 is approximately m times that of the conventional optical deflection element. Therefore, according to the optical deflection element 52, it is possible to obtain a large deflection angle compared to the conventional optical deflection element.

According to the optical deflection element 52, the resolution N can be improved with each by increasing the thickness D and enlarging the beam diameter $\omega$. Hence, the optical deflection element 52 is a high-performance element which has a large deflection angle and low power consumption.

The optical deflection element 52 can be produced with ease using a known thin film technique such as sputtering, metal evaporation and photoetching.

The materials used for the various layers of the optical deflection element are not limited to those of the described embodiment. For example, a material such as PLZT which generates a secondary electrooptic effect may also be used for the electrooptic layer 54.

Further, the present invention is not limited to these embodiments, but various variations and modifications may be made without departing from the scope of the present invention.

What is claimed is:

1. An optical deflection element for receiving incident beam and deflecting the incident beam with an arbitrary deflection angle, said optical deflection element comprising:

a plurality of unit members which are successively stacked, each of said unit members including an electrooptic layer;

an electrode layer formed on a surface of each electrooptic layer; and an insulator layer formed on said surface of each electrooptic layer adjacent to said electrode layer, a boundary between said electrode layer and said insulator layer being inclined to an optical axis of the incident beam.

2. The optical deflection element as claimed in claim 1, wherein said surface of each electrooptic layer has a rectangular shape, and said boundary matches a diagonal line of the rectangular shape.

3. The optical deflection element as claimed in claim 1, wherein optical axes of two mutually adjacent electrooptic layers are arranged in mutually opposite directions, and the electrode layers of the two mutually adjacent electrooptic layers are applied with voltages of mutually opposite polarities.

4. The optical deflection element as claimed in claim 1, wherein said electrooptic layer is made of a material selected from a group including $LiNbO_3$, and said electrode layer is made of a material selected from a group including indium tin oxide (ITO).

5. The optical deflection element as claimed in claim 4, wherein said electrode layer is transparent to the incident beam.

6. The optical deflection element as claimed in claim 1, wherein a change $\Delta n$ in a refractive index of said electrooptic layer is described by $$\Delta n = (-\tfrac{1}{2}) n^3_e r_{33}(V_O/d)$$

where each electrooptic layer has a thickness d, a voltage $V_O$ is applied across the electrode layers, $n_e$ denotes a refractive index along a direction in which the unit members are stacked and $r_{33}$ denotes an electrooptic coefficient.

7. The optical deflection element as claimed in claim 1, wherein a change $\Delta n$ in a refractive index of said electrooptic layer is described by $$\Delta n \approx m(-\tfrac{1}{2}) n^3_e r_{33}(V_O/D)$$

where a voltage $V_O$ is applied across the electrode layers, m denotes the number of unit members, $n_e$ denotes a refractive index along a direction in which the m unit members are stacked, $r_{33}$ denotes an electrooptic coefficient, D denotes a thickness of the m unit members which are stacked.

8. A space optical matrix switching device comprising:
   a collimator element including an array of microlenses for receiving incident beam;
   a space deflection element coupled to said collimator element and including an array of optical deflection elements for deflecting collimated beam received from said collimator element depending on a change in a refractive index based on electrooptic effect;
   a deflection angle amplifier element coupled to said space deflection element and including an array of microholograms for amplifying a deflection angle of deflected beam received from said space deflection element by diffraction so as to switch an optical path of the deflected beam; and
   coupling means coupled to said deflection angle amplifier element for selectively outputting the deflected beam received via the switched optical path.

9. The space optical matrix switching device as claimed in claim 8 which is coupled to input optical fibers and output optical fibers, wherein each microlens of said collimator element is coupled to one of the input optical fibers, and said coupling means selectively outputs the deflected beam received via the switched optical path to one of the output optical fibers.

10. The space optical matrix switching device as claimed in claim 9, wherein said coupling means includes an angle conversion element coupled to said deflection angle amplifier element and including an array of microholograms provided in correspondence with the microholograms of said deflection angle amplifier element, and a coupling element coupled to said angle conversion element and including an array of microlenses which are provided in correspondence with the microholograms of said angle conversion element, each of the microlenses of said angle conversion element being coupled to one of the output optical fibers.

11. The space optical matrix switching device as claimed in claim 8, wherein said coupling means includes an angle conversion element coupled to said deflection angle amplifier element and including an array of microholograms provided in correspondence with the microholograms of said deflection angle amplifier element, and a coupling element coupled to said angle conversion element and including an array of microlenses which are provided in correspondence with the microholograms of said angle conversion element.

12. The space optical matrix switching device as claimed in claim 8, wherein the optical deflection element of said space deflection element includes:
   a plurality of unit members which are successively stacked, each of said unit members including an electrooptic layer;
   an electrode layer formed on a surface of each electrooptic layer; and
   an insulator layer formed on said surface of each electrooptic layer adjacent to said electrode layer,
   a boundary between said electrode layer and said insulator layer being inclined to an optical axis of the incident beam.

* * * * *